United States Patent
Adam et al.

(10) Patent No.: US 12,432,202 B1
(45) Date of Patent: *Sep. 30, 2025

(54) AUTHENTICATION FOR APPLICATION DOWNLOADS

(71) Applicant: United Services Automobile Association (USAA), San Antonio, TX (US)

(72) Inventors: Patrick Adam, Helotes, TX (US); Gabriel Carlos Fernandez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,901

(22) Filed: Feb. 2, 2024

Related U.S. Application Data

(63) Continuation of application No. 17/463,953, filed on Sep. 1, 2021, now Pat. No. 11,924,201, which is a continuation of application No. 16/282,179, filed on Feb. 21, 2019, now Pat. No. 11,140,158.

(60) Provisional application No. 62/715,681, filed on Aug. 7, 2018.

(51) Int. Cl.
*H04L 9/40* (2022.01)
*H04L 9/32* (2006.01)
*H04L 67/00* (2022.01)

(52) U.S. Cl.
CPC ........ *H04L 63/0861* (2013.01); *H04L 9/3226* (2013.01); *H04L 63/0853* (2013.01); *H04L 63/102* (2013.01); *H04L 63/108* (2013.01); *H04L 63/126* (2013.01); *H04L 67/34* (2013.01)

(58) Field of Classification Search
CPC . H04L 63/0861; H04L 63/126; H04L 63/108; H04L 63/102; H04L 63/0853; H04L 67/34; H04L 9/3226
See application file for complete search history.

(56) References Cited

U.S. PATENT DOCUMENTS

| | | | |
|---|---|---|---|
| 6,553,375 B1 * | 4/2003 | Huang | H04L 67/306 |
| 11,140,158 B1 | 10/2021 | Adam et al. | |
| 2007/0198834 A1 * | 8/2007 | Ksontini | G06F 8/65 |
| | | | 455/411 |

(Continued)

*Primary Examiner* — Khoi V Le
(74) *Attorney, Agent, or Firm* — Perkins Coie LLP

(57) ABSTRACT

Embodiments described herein disclose technology for verifying authorization of an application download. The system can receive from a device associated with a user, a request to download an application. In response to a first instance of the application being downloaded on the device, the system can assign a unique identifier to the first instance of the application. After the application is downloaded and prior to granting the person requesting the application download access to the first instance of the application, the system can request via the first instance of the application identification information and particular authentication information to verify that the person requesting the application download is authorized to do so. In response to verifying that the person requesting the application download is authorized, the unique identifier can be associated with the account, user and/or device to result in a verified download of the first instance of the application.

17 Claims, 6 Drawing Sheets

(56) References Cited

U.S. PATENT DOCUMENTS

| | | | | |
|---|---|---|---|---|
| 2007/0266426 A1* | 11/2007 | Iyengar | ............... | H04L 63/1458 |
| | | | | 726/5 |
| 2014/0245013 A1* | 8/2014 | Kim | ........................ | H04L 67/34 |
| | | | | 726/4 |
| 2015/0180851 A1* | 6/2015 | Zou | ........................ | H04L 9/3226 |
| | | | | 726/4 |
| 2016/0127359 A1* | 5/2016 | Minter | ................ | H04L 63/0861 |
| | | | | 726/6 |
| 2018/0218339 A1* | 8/2018 | Jenkins | ................ | G06Q 30/018 |

* cited by examiner

AUTHENTICATION FOR APPLICATION DOWNLOADS

CROSS-REFERENCE TO RELATED APPLICATIONS

This application is a continuation of U.S. patent application Ser. No. 17/463,953 filed Sep. 1, 2021, now allowed, which is a continuation of U.S. patent application Ser. No. 16/282,179 filed Feb. 21, 2019, entitled "AUTHENTICATION FOR APPLICATION DOWNLOADS," issued as U.S. Pat. No. 11,140,158 on Oct. 5, 2021, which is a non-provisional of and claims priority to U.S. Provisional Application No. 62/715,681 filed Aug. 7, 2018, entitled "AUTHENTICATION FOR APPLICATION DOWNLOADS," which are hereby incorporated by reference in their entireties for all purposes.

BACKGROUND

Due in part to mass data breaches and phishing attacks exposing billions of email addresses, usernames and passwords in the past few years, account takeovers are prevalent. Many people use the same username/password combination across multiple accounts, which makes it easy for cybercriminals to sell stolen credentials. Fraudulent actors take over accounts for various types of services, including bank accounts, credit card accounts, and email accounts. Service providers attempt to curtail fraudulent activity by collecting and using information such as a username and password or device characteristics to authenticate the user. These techniques have limitations, particularly given the prevalence of stolen or breached data. Should a fraudster steal a device and have access to the stolen credentials, the stolen credentials can allow a fraudster to download an application, provide the user's username and password, and obtain access to the user's account. Most companies assume that the person downloading the application is in fact the owner of the device or account (or an authorized user of the device or account) and do not require credentials that are more difficult for fraudsters to obtain. That is, although an application is being downloaded to a user's device, the application provider currently lacks technology to verify that the user himself or herself is the person responsible for downloading the application.

Figure 1:
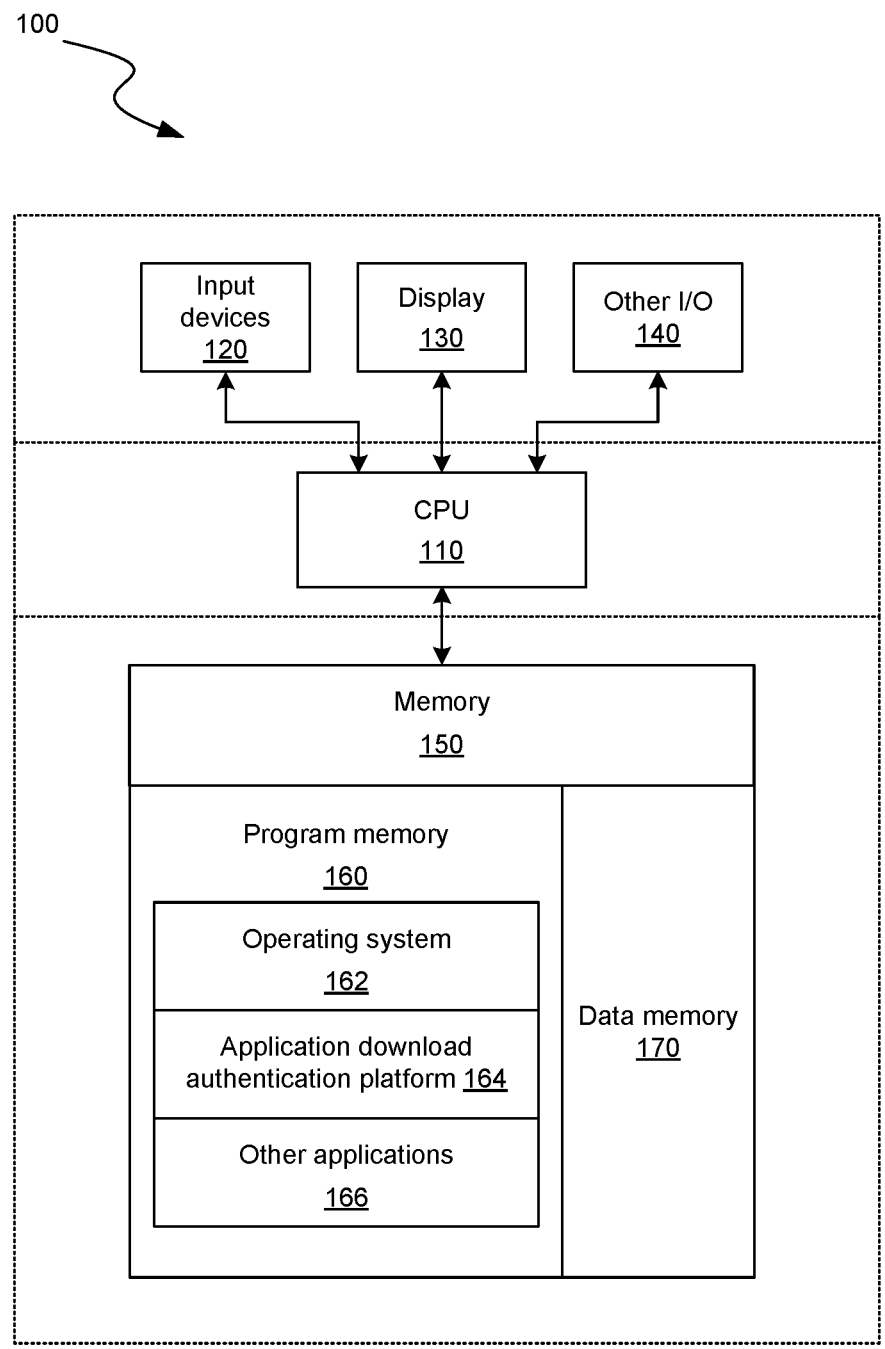
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

When a company offers an application for download so that users can access their account, the company typically requests identifying information (e.g., email address) or identifying information (e.g., username) along with verification information (e.g., password, passcode, personal identification number). Noting or verifying the user's identity using traditional methods is typically the extent of verification that companies perform before allowing the user to use the application and access their account information. That is, in prior systems, companies generally do nothing more than check a username/password combination or device characteristics to verify that the user associated with the account (and/or device) is in fact the person requesting the application download ("requestor"). Moreover, when users use more than one device when interacting with a company, device management can be challenging. Companies generally use device attributes to identify the device and install a token on the device to recognize the device. Thus, when sending messages to the user via an application, companies send the message to all devices associated with the user.

To address the above-mentioned issues, the technology described herein provides a system and method that verifies that the person requesting the application download is authorized to do so and provides an improved system to manage devices using unique identifiers associated with application downloads. To verify that the person requesting the application download is authorized, first, the system can receive a request to download an application. In some implementations, the device is associated with the user (e.g., device characteristics are stored in a user profile), whereas in other implementations, the device is not associated with the user. In response to a first instance of the application being downloaded to the device, the issuer of the application can assign a unique identifier to the first instance of the application.

After the application is downloaded, the system can ask the person requesting the application download to provide identification or identification/verification information and/or can identify the user via the device. Instead of stopping at verifying the user's identity with typical methods (e.g., password, device fingerprint, evidence of secure browsing solution, secure token), the system can further request, via the first instance of the application, additional authentication information to verify the identity of the user. In one example of additional authentication information, the system can request an image of a government-issued identification card associated with the user identified by the username/password (or an authorized secondary user of the account) and a real-time image or video of the person requesting the download. Government-issued identification card can be any type of identification card with an image of the person (e.g., library card, driver's license, learner's permit, passport) issued by any government (e.g., state, federal, city). The system can verify the authenticity of the government-issued identification card and that the image of the person is in real-time (i.e., instantaneous or within minutes), or a third party can do so. After verifying the authenticity of the government-issued identification card and real-time nature of the image of the person, the system determines whether the image of a person on the government-issued identification card matches the real-time image of the person. If so, the system has verified that the person requesting the application download is authorized. The unique identifier can be associated with the device, user, and/or account. In another example of additional authentication information, a second device associated with the user (e.g., a device that has gone through the additional authentication process) can be used to verify the identity of the person downloading the application. In some embodiments, to obtain additional authentication information, the system can request that the user perform a face and/or voice biometric if the user has existing registered biometric information associated with the user's profile. The characteristics of such information can be compared with the characteristics of the on-file biometric information.

By assigning a unique identifier to the application and to the user or account, device management can be simplified. By verifying the specific download of the application on a device, messages can be sent to a specific device with confidence that the correct user is receiving the communication. Additionally, device characteristics do not need to be known; rather communication with the user can occur via the application. For example, if the user downloads a second instance of the application to a second device, the second instance of the application will receive a new and separate unique identifier. After the requestor of the application download verifies that he or she is authorized to download the second instance of the application to the second device, the system can communicate with the user via the first instance of the application or the second instance of the application. This is helpful in tracking devices in which to interact with because some users download the application on two or more devices (e.g., tablet, mobile device). Tracking the application downloads using the unique identifiers is also helpful in tracking whether a user has replaced a device and whether the unique identifier should be retired such that the unique identifier and that instance of the application will never be used again. In an example, if the user downloads the second instance of the application to the second device and the first instance of the application has not been used in a threshold period of time (e.g., 6 months), the system can ask the user via the second instance of the application whether the first instance of the application should be removed from the first device. The user can grant or deny permission in which case the unique identifier of the first application is either retired or not retired, respectively. In some implementations, the application is removed from the device after the unique identifier is retired. If the user does not provide an answer, the system can determine the period of time in which there has been activity via the first instance of the application and determine whether the unique identifier should be retired. Should the user wish to redownload the application, the user will need to re-prove that he or she is authorized to download the application. One benefit of tracking unique identifiers is that push notifications or other communications via the application can be sent to a specific device associated with a user instead of broadcasted to all devices associated with the user with the application.

This disclosure describes systems and processes designed to authenticate the person downloading an application and to provide improved device management solutions using unique identifiers for an application. Various embodiments may provide one or more of the following technological improvements: (1) increase security by authenticating the person downloading the application; (2) increase efficiency of device management by tracking application downloads via unique identifier rather than device characteristics; and (3) reduce account takeovers by requiring real-time information for application downloads and re-downloads.

In the following description, for the purposes of explanation, numerous specific details are set forth in order to provide a thorough understanding of embodiments of the present technology. It will be apparent, however, that embodiments of the present technology may be practiced without some of these specific details Suitable System Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that manage payment card transaction authorizations. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display 130 is separate from the input device. Examples of display devices are: a LCD display screen; a LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory 150 includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 150 is not a propagating signal divorced from underlying hardware; a memory is thus non-transitory. A memory 150 can include program memory 160 that stores programs and software, such as an operating system 162, application download authentication platform 164, and other application programs 166. A memory 150 can also include data memory 170 that can include user identifying information (e.g., addresses, usernames, passwords, personal identification numbers), historical information regarding use of an instance of an application, web browsing history, and other information which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
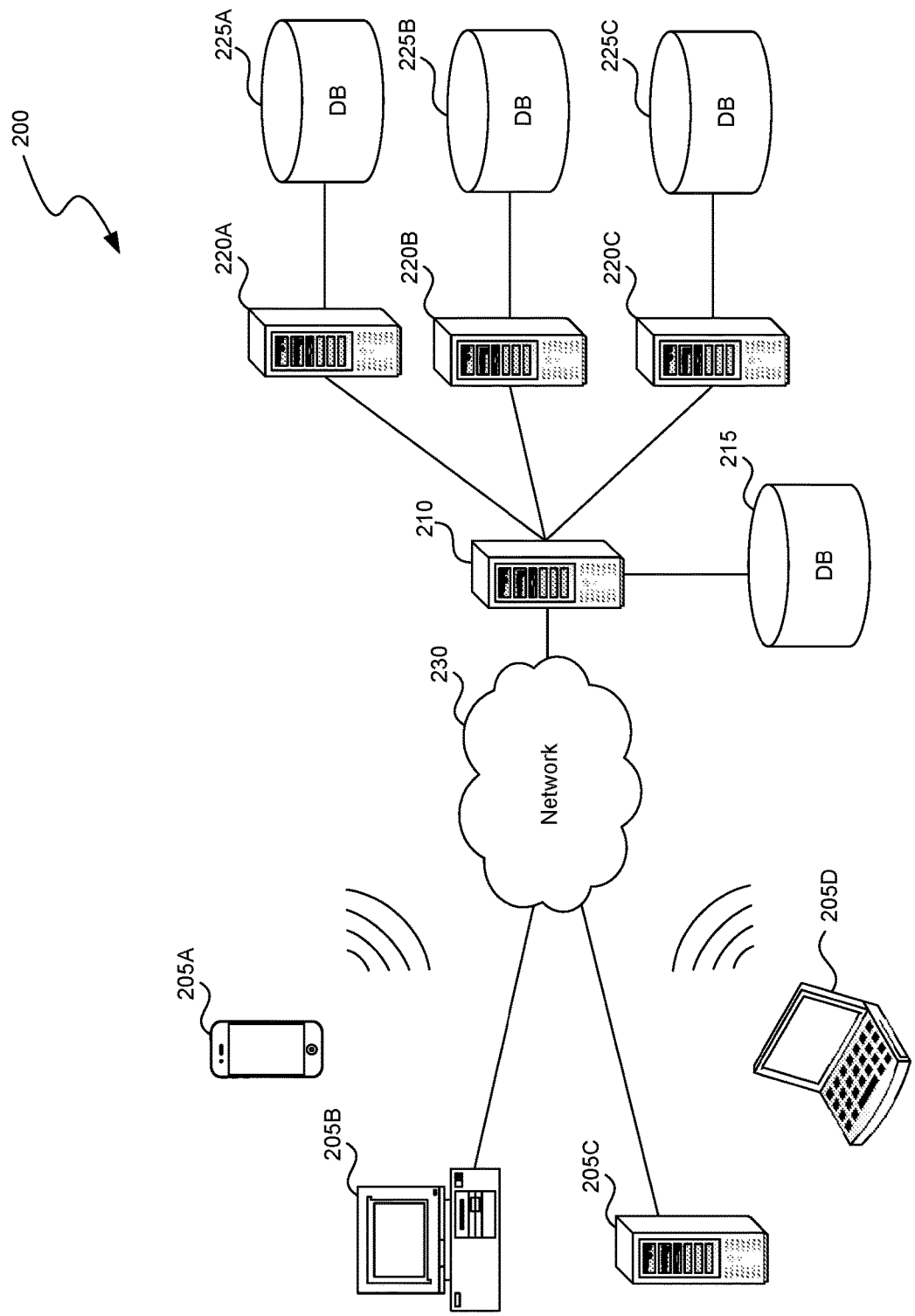
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g., store) information such as unique identifiers assigned to devices associated with the user, whether application downloads have been verified as authorized by the system, transactions or other activity made via an application. Though databases 215 and 225A-C are displayed logically as single units, databases 215 and 225A-C can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
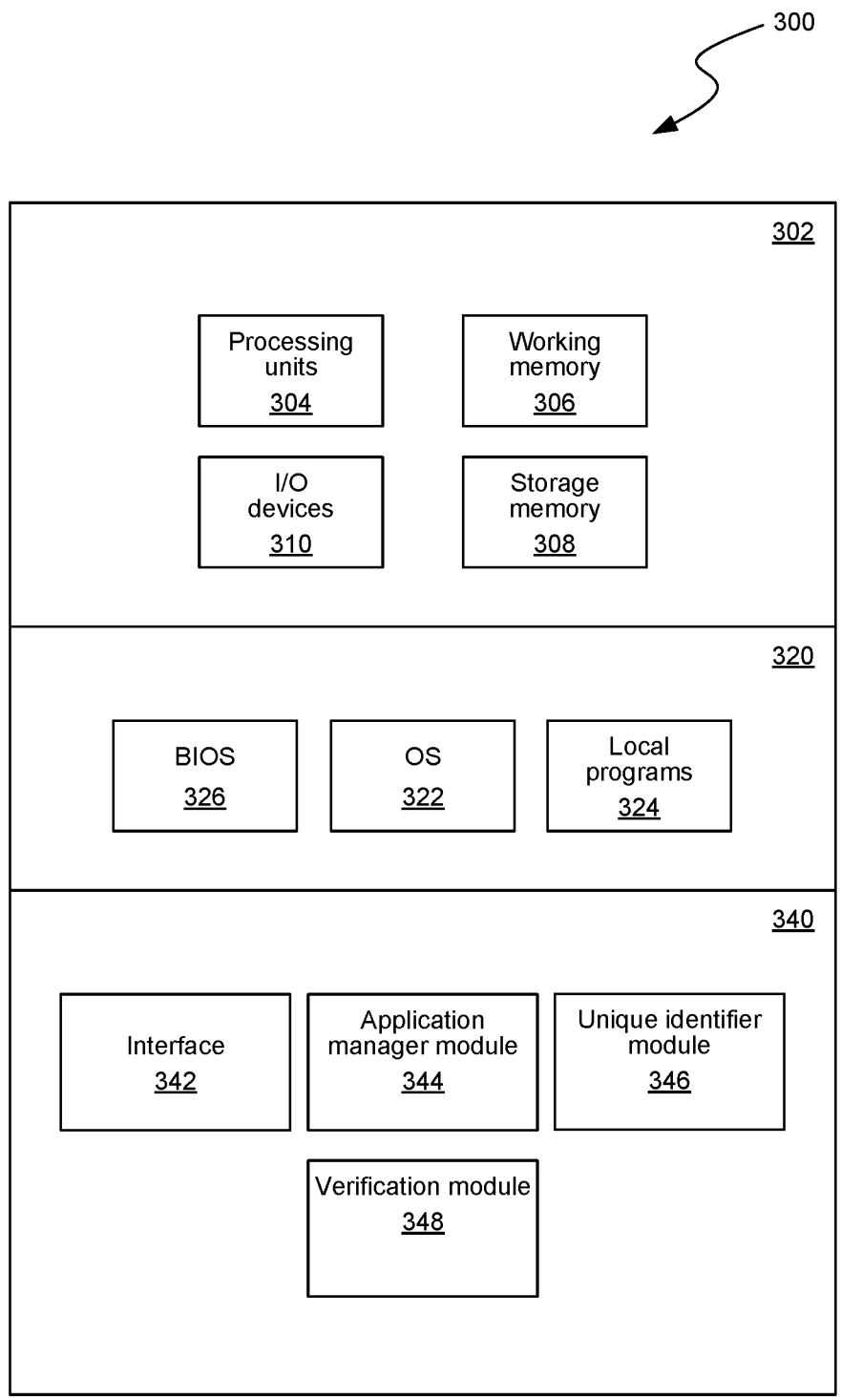
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220A-C. In some embodiments, some components of components 300 can be implemented in a client computing device while others are implemented on a server computing device.

General software 320 can include various applications, including an operating system 322, local programs 324, and a basic input output system (BIOS) 326. Specialized components 340 can be subcomponents of a general software application 320, such as local programs 324. Specialized components 340 can include application manager module 344, unique identifier module 346, verification module 348, and components that can be used for transferring data and controlling the specialized components, such as interface 342. In some implementations, components 300 can be in a computing system that is distributed across multiple computing devices or can be an interface to a server-based application executing one or more of specialized components 340.

Application manager module 344 receives, manages, and tracks application downloads. To do so, when a client device makes a request to download an application, application manager module 344 assigns a unique identifier provided by unique identifier module 346 to the instance of the application downloaded to the device. After the instance of the application downloaded to the user's device verifies that the person who requested the application download is the same person associated with the device (i.e., the application download was an authorized download), application manager module 344 associates the unique identifier with the account, user and/or device. In some implementations, the system can scrape the phone number, serial number, name of the device, user-defined name of the device, operating system name, operating system version, broad device model (e.g., iPhone, iPad, iPod), specific device model (e.g., iPhone 7s), and carrier information associated with the device include carrier name (e.g., AT&T, Verizon), ISO Country Code, Mobile Country Code, Mobile Network Code, among other attributes, to further assist with device management. Such attributes can be used when identifying an application/device while communicating with the user instead of using the unique identifier. In some implementations, the application can send an SMS or other message on behalf of the user to the server to provide additional attributes (e.g., phone number, carrier information), or the application can prompt the user to send an SMS or other message to the server to provide this information. In some embodiments, associating the unique identifier with the user and/or device automatically results in the application download as being "verified," "authorized," or "authenticated" in the system. In other embodiments, application manager module 344 can separately record that the application download was verified or authorized.

Device management is simplified by tracking whether the application download has been verified and by using an assigned unique identifier associated with the instance of an application downloaded to the device. That is, instead of storing and checking device characteristics to authenticate and communicate with the user in the future, the system can use the application to do so. For example, messages can be sent to the device via the application (i.e., sending to the device associated with the unique identifier) without fear of sending information to an unauthorized person who downloaded the application without permission. In another example of simpler device management, application manager module 344 can permanently retire instances of applications by retiring unique identifiers. For example, if a device has been compromised, application manager module 344 can simply retire the unique identifier and that instance of the application will no longer be accessible. In some implementations, a persistent flag can be set on the compromised device so that if the application is deleted and re-installed on the same device, it can still be determined that the device was compromised. For example, using the iOS Device Check API, a compromised device can be flagged with this persistent flag, and this information can subsequently be used by the server in order to require additional actions (e.g., more rigorous authentication, place the device on watch list). Should a fraudulent actor try to re-download the application, the authentication procedures outlined below will prevent the fraudulent actor from accessing the application.

In another example, if the user re-downloads the application onto a second device associated with the user (i.e., a second instance of the application), the user will be required to re-authenticate to ensure the download was authorized. Then, application manager module 344 can communicate with the user via the second instance of the application using the unique identifier to inquire about the first instance of the application downloaded. For example, the user can be asked whether the first instance of the application should be removed from the device or if the user would prefer that the first instance of the application be accessible on the device. In some embodiments, if the user has not accessed the first instance of the application for a threshold period of time (e.g., 6 months), application manager module 344 can ask the user whether the application should be removed from the device or can simply remove the application from the device and retire the unique identifier. Controlling access to applications without requiring specific device characteristics provides efficiencies and increases security. Moreover, verifying the application download enables authentication capabilities. For example, a push notification can be sent to a specific device when the application is verified and associated with a specific unique identifier rather than the typical notification that broadcasts the message to all devices associated with a user account.

Unique identifier module 346 assigns a unique identifier to each instance of an application downloaded to a device. The unique identifier is not re-used on any other instance of the application. For example, if the user re-downloads the application to the same device (or downloads the application to a new device), a new unique identifier will be assigned to the new download of the application.

Verification module 348 verifies that the person who requested the download of the application on the device was authorized to do so. Verification module 348 can reside on the client side and the functionality can be included in the downloaded application. In some implementations, the person who downloaded the device is required to provide identification and/or verification of identification that identifies an account of the user. For example, the requestor may be asked to provide a name, address, username, username/password and/or personal identification number. Such information can identify an account. In other embodiments, the user is identified using information collected from the device. In prior systems, no additional information was required to access many applications. Such information can be easily obtained by a fraudster. Thus, to provide more robust verification that the person downloading the device is either the owner of the account identified in the identification information or an authorized user of the account (e.g., a child or secondary account owner identified in the account profile), verification module 348 can request information that is much more difficult for a fraudster to obtain.

In some implementations, verification module 348 can use biometric information to confirm that the requestor of the application download is authorized to download the application onto the device and access the account. To do so, verification module 348 can request the user to provide (e.g., scan, photo, video) a government-issued identification card and a real-time picture or video of the requestor. The application may use a camera feature of the phone or computer to obtain the government-issued identification card and the real-time picture or video of the user. The requestor may be asked to blink or make some movement to ensure that the requestor is not using a photograph to manipulate the system. Verification module 348 can validate the authenticity of the government-issued identification card (or send the image of the government-issued identification card to third party for verification) using a database of government-issued identification cards complied from state or federal agencies. After ensuring that the government-issued identification card is authentic and that the image of the requestor was taken within a threshold timeframe of the download of the application, verification module 348 can compare the image of the person on the government-issued identification card with the real-time image of the requestor. If they are a match, verification module 348 can grant the user access to the application. If they are not a match, verification module 348 can disallow access to the application and can report to application manager module 344 that the download is not validated. The unique identifier can be retired. In some embodiments, the unique identifier is not retired for a period of time (e.g., 6 months) and is instead placed in a "hold" status in case the user attempts to verify the application download again.

Verification module 348 can authenticate the person who downloaded the application in other ways. For example, the application can send a code to a second device associated with the user and request the user to provide the code. In some embodiments, a notification can be sent to a device via a previously downloaded application that has been authenticated. As another example, verification module 348 can request the user perform a biometric authentication of face and/or voice to authenticate when the user has a previously registered face and/or voice biometric on file with the server.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
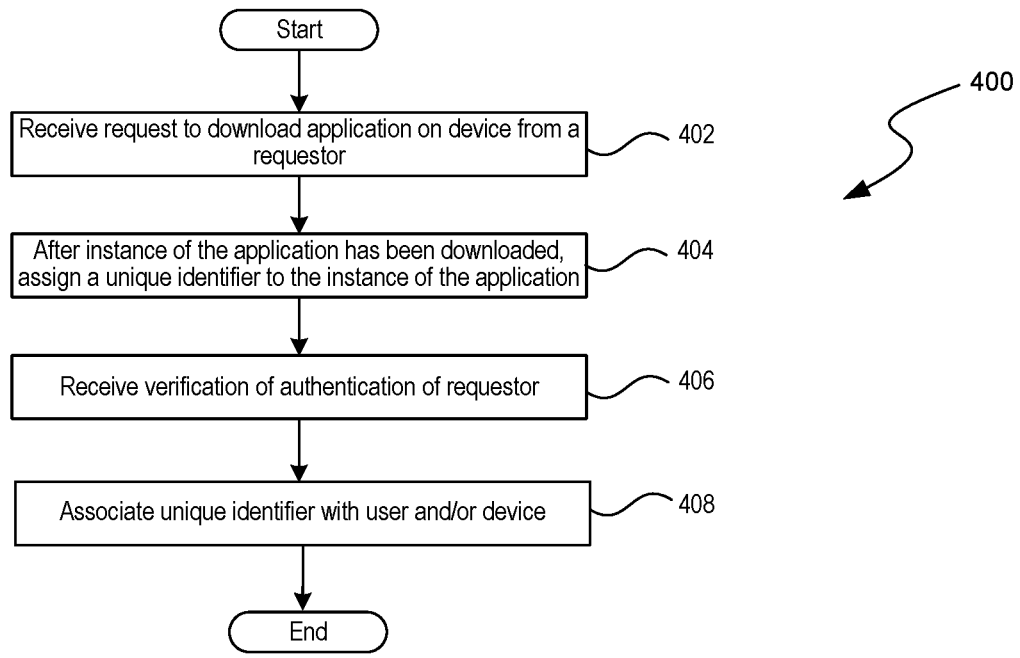
FIG. 4 is a flow diagram illustrating a process for verifying authorization of an application download from the perspective of a server.

FIG. 4 is a flow diagram illustrating a process 400 for verifying authorization of an application download from the perspective of a server. Receiving operation 402 receives a request to download an application on a device from a requestor. After an instance of the application has been downloaded on the device, assigning operation 404 assigns a unique identifier to the instance of the application. Once downloaded, the application can request and verify authentication information from the requestor to ensure that the requestor is authorized to download the application. Receiving operation 406 receives verification of authentication from the application. Associating operation 408 can associate the unique identifier with the user, account, and/or the device.

Figure 5:
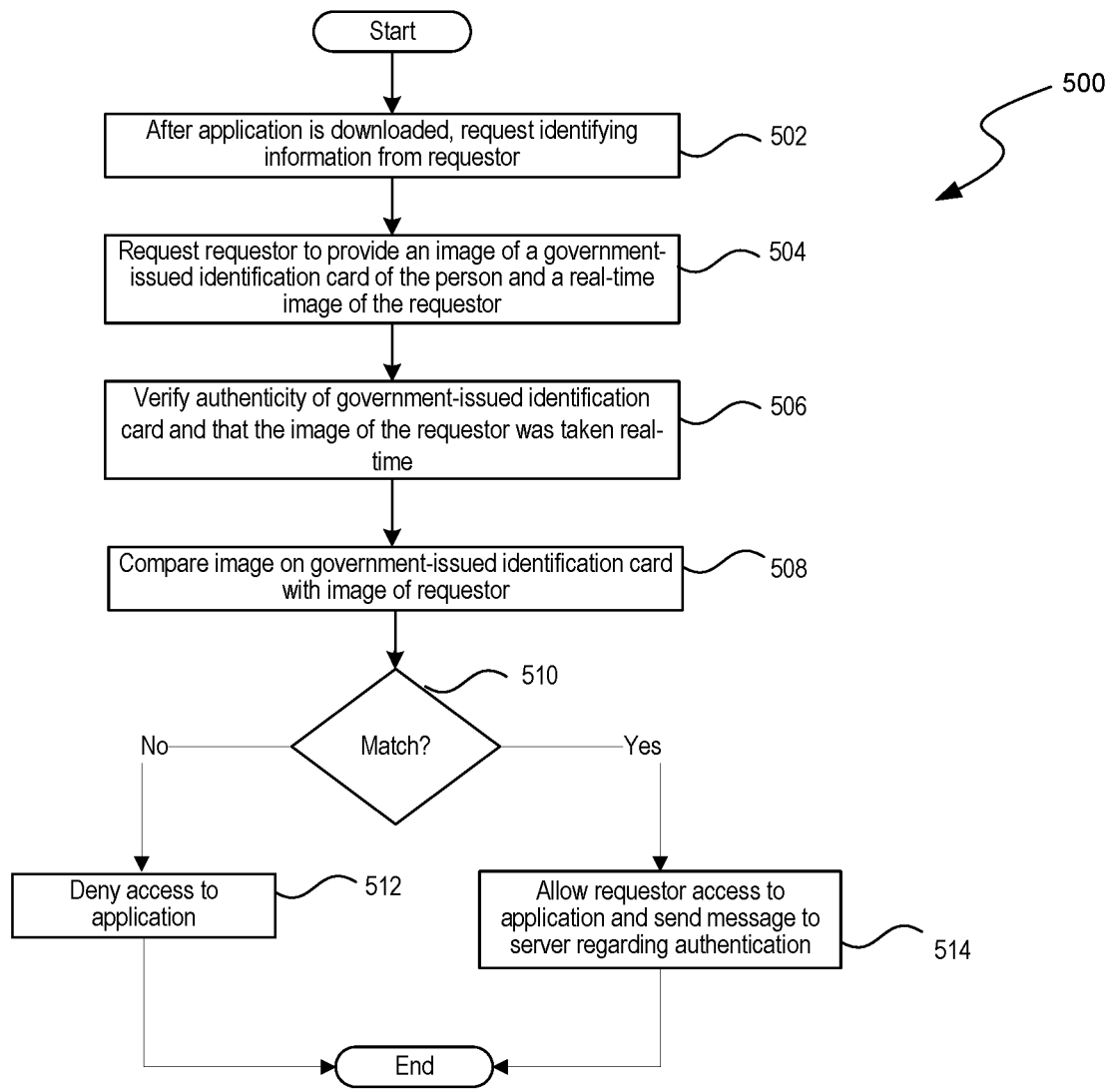
FIG. 5 is a flow diagram illustrating a process for verifying authorization of an application download from the perspective of a client device.

FIG. 5 is a flow diagram illustrating a process for verifying authorization of an application download from the perspective of a client device. After the application has been downloaded to the device, requesting operation 502 requests, via the application, identifying information from the person who requested the download of the application. Such information can include a username, a username/password, personal identification number or other identifying information. In some embodiments, the username/password has already been established by the user. In some embodiments, the user's identity is determined based on device characteristics. To authenticate that the person requesting the download is the user associated with the account or user identified via the identifying information, requesting operation 504 can request, by the application, further authenticating information such as an image of a government-issued identification card issued to the person identified using the identifying information and a real-time image of the requestor. After receiving the government-issued identification card and image of the requestor, verifying operation 506 verifies that the government-issued identification card is authentic using for example, government agency databases. Verifying operation 506 can also request a face and/or voice biometric from the user assuming the user has previously registered their biometric information with the server. The server can subsequently perform liveliness checks and other anti-spoofing mechanisms to ensure the biometric is occurring real-time and not being spoofed.

Verifying operation 506 can further verify that the image of the requestor is a real-time image rather than a previously taken picture (e.g., by checking the time stamp, by requesting the user to smile or blink). Comparing operation 508 compares the picture on the government-issued identification card with the real-time image of the requestor to determine whether there is a match. In some implementations, all or portions of verifying operation 506 and comparing operation 508 can be outsourced to a third party. When decision block 510 determines that there is not a match between the image of the person on the government-issued identification card and the real-time image of the requestor, decision block 510 branches to denying operation 512 where the requestor is denied access to the application. In some embodiments, the application is removed from the device and a hold is placed on the account. When decision block 510 determines that there is a match between the image of the person on the government-issued identification card and the requestor, decision block 510 branches to allowing operation 514 where the requestor is granted access to the application. Allowing operation 514 can further send a message to the server regarding authentication of the application download, which can trigger the server to flag the unique identifier as verified.

Figure 6:
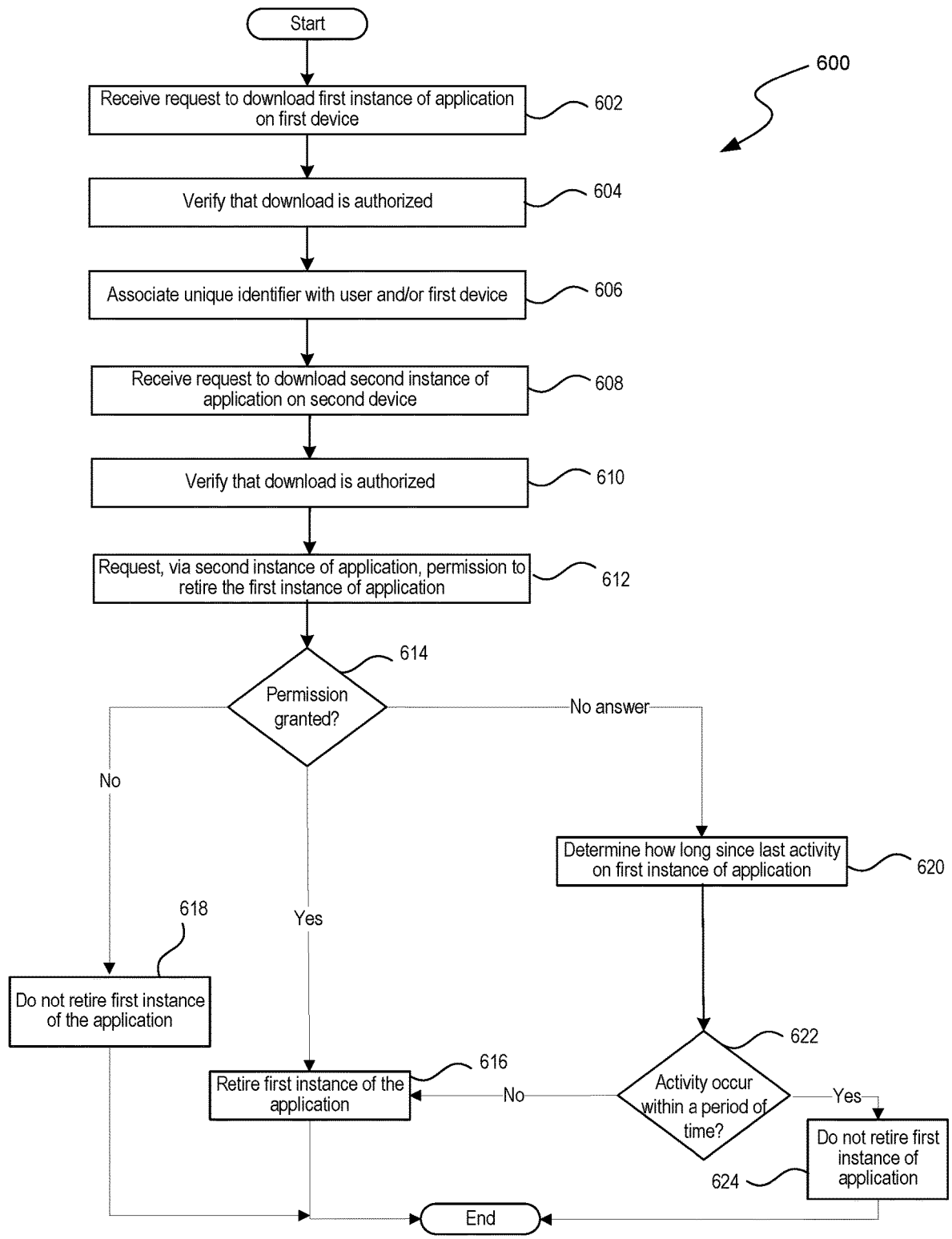
FIG. 6 is a flow diagram illustrating a process for managing devices using unique identifiers associated with application downloads.

FIG. 6 is a flow diagram illustrating a process for managing devices using unique identifiers associated with application downloads. Receiving operation 602 receives a request to download the first instance of the application on a first device. Verifying operation 604 verifies that the download was authorized. For example, the system can either recognize the user via the device or request the user to provide identification (e.g., name, email address) or identification and verification (e.g., username and password). The identification can be associated with an account of the user. Thereafter, the system can verify the download was authorized by requesting authentication credentials (e.g., a code sent to a second device or application associated with the user, government-issued identification card and real-time image). After the system verifies that the download was authorized, associating operation 606 associates a unique identifier with the user (e.g., profile or account of the user) and/or the device. Receiving operation 608 receives a request to download a second instance of the application on a second device associated with the user or an account of the user. Verifying operation 610 verifies that the download of the second instance of the application on the second device can be authorized in the same or similar manner as verifying operation 604.

Due to the presence of two applications associated with the same user or account and/or a lack of use of the first instance of the application, requesting operation 612 requests, via the second instance of the application, permission to retire the first instance of the application. In some implementations, a message requesting permission to retire the second instance of the application can be sent via the first instance of the application. When the user responds granting permission to retire the first instance of the application, decision operation 614 branches to retiring operation 616 in which the unique identifier associated with the first instance of the application is retired such that the first instance of the application is not usable. In some embodiments, the application is deleted by the user after the unique identifier is retired; in other embodiments, the application is removed automatically. When the user responds that permission is not granted to retire the first instance of the application, the system does not retire the first instance of the application per operation 618. When the system receives no answer from the user within a certain time period (e.g., a week), determining operation 620 determines how long it has been since the last activity (e.g., using the application, checking an account balance) was performed on the first instance of the application. Decision operation 622 determines whether the activity occurred within a threshold period of time (e.g., within the past 6 months). When the activity occurred within the threshold period, decision operation 622 branches to operation 624 in which the system does not retire the first instance of the application. On the other hand, when the activity did not occur within the threshold period, decision operation 622 branches to retiring operation 616 where the first instance of the application is retired from the first device. It will be appreciated that the system can correspond with the user via the first instance of the application regarding the second instance of the application in the same manner as described in FIG. 6.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communication links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

The invention claimed is:

1. A method comprising:
   downloading, by a device associated with a user, an instance of an application;
   in response to downloading the instance of the application and prior to receiving access to the instance of the application, receiving, by the device, a request for an image of a government-issued identification card; and
   a real-time image of the user captured at a time after the request is received by the device;
   sending, to an authorization system separate from the device, the image of the government-issued identification card and the real-time image of the user to:

verify an authenticity of the government-issued identification card; and verify that a picture of a person on the image of the government-issued identification card matches the real-time image of the user;

in response to a comparison of the image of the government-issued identification card to the real-time image of the user resulting in a match, receiving access to the instance of the application, wherein a unique identifier is assigned to the instance of the application and is associated with the device or the user; and in response to receiving the access to the instance of the application, automatically allowing the user to use the application on the device in future sessions as an authenticated user based on the unique identifier.

2. The method of claim 1, further comprising:

in response to receiving the access to the instance of the application, communicating as the authenticated user via the instance of the application based on the unique identifier rather than device characteristics of the device.

3. The method of claim 1, further comprising:

in response to the user sending permission via a second instance of the application on a second device, removing the instance of the application from the device.

4. The method of claim 1, wherein the government-issued identification card is associated with an identity identified by authentication information of the user, and wherein the authentication information comprises a username and a password or a personal identification number.

5. The method of claim 1, wherein the unique identifier assigned to the instance of the application is retired when the instance of the application has not been used in a threshold time.

6. The method of claim 4, wherein the authentication information includes first biometric information from the user, and wherein characteristics generated from the first biometric information are compared with characteristics generated from second biometric information previously provided by the user.

7. A system comprising:

one or more processors; and one or more memories storing instructions that, when executed by the one or more processors, cause the system to perform a process comprising:

downloading, by a device associated with a user, an instance of an application;

in response to downloading the instance of the application and prior to receiving access to the instance of the application, receiving, by the device, a request for an image of a government-issued identification card; and a real-time image of the user captured at a time after the request is received by the device;

sending, to an authorization system separate from the device, the image of the government-issued identification card and the real-time image of the user to:

verify an authenticity of the government-issued identification card; and verify that a picture of a person on the image of the government-issued identification card matches the real-time image of the user;

in response to a comparison of the image of the government-issued identification card to the real-time image of the user resulting in a match, receiving access to the instance of the application, wherein a unique identifier is assigned to the instance of the application and is associated with the device or the user; and in response to receiving the access to the instance of the application, automatically allowing the user to use the application on the device in future sessions as an authenticated user based on the unique identifier.

8. The system according to claim 7, wherein the process further comprises:

in response to receiving the access to the instance of the application, communicating as the authenticated user via the instance of the application based on the unique identifier rather than device characteristics of the device.

9. The system according to claim 7, wherein the process further comprises:

in response to the user sending permission via a second instance of the application on a second device, removing the instance of the application from the device.

10. The system according to claim 7, wherein the government-issued identification card is associated with an identity identified by authentication information of the user, and wherein the authentication information comprises a username and a password or a personal identification number.

11. The system according to claim 7, wherein the unique identifier assigned to the instance of the application is retired when the instance of the application has not been used in a threshold time.

12. The system according to claim 10, wherein the authentication information includes first biometric information from the user, and wherein characteristics generated from the first biometric information are compared with characteristics generated from second biometric information previously provided by the user.

13. A non-transitory computer-readable medium storing instructions that, when executed by a computing system, cause the computing system to perform operations comprising:

downloading, by a device associated with a user, an instance of an application;

in response to downloading the instance of the application and prior to receiving access to the instance of the application, receiving, by the device, a request for an image of a government-issued identification card; and a real-time image of the user captured at a time after the request is received by the device;

sending, to an authorization system separate from the device, the image of the government-issued identification card and the real-time image of the user to:

verify an authenticity of the government-issued identification card; and verify that a picture of a person on the image of the government-issued identification card matches the real-time image of the user;

in response to a comparison of the image of the government-issued identification card to the real-time image of the user resulting in a match, receiving access to the instance of the application, wherein a unique identifier is assigned to the instance of the application and is associated with the device or the user; and in response to receiving the access to the instance of the application, automatically allowing the user to use the application on the device in future sessions as an authenticated user based on the unique identifier.

14. The non-transitory computer-readable medium of claim 13, wherein the operations further comprise:

in response to receiving the access to the instance of the application, communicating as the authenticated user via the instance of the application based on the unique identifier rather than device characteristics of the device.

15. The non-transitory computer-readable medium of claim 13, wherein the operations further comprise:

in response to the user sending permission via a second instance of the application on a second device, removing the instance of the application from the device.

16. The non-transitory computer-readable medium of claim 13, wherein the government-issued identification card is associated with an identity identified by authentication information of the user, and wherein the authentication information comprises a username and a password or a personal identification number.

17. The non-transitory computer-readable medium of claim 16, wherein the unique identifier assigned to the instance of the application is retired when the instance of the application has not been used in a threshold time, wherein the authentication information includes first biometric information from the user, and wherein characteristics generated from the first biometric information are compared with characteristics generated from second biometric information previously provided by the user.

* * * * *